United States Patent
Nishida et al.

(10) Patent No.: US 9,419,302 B2
(45) Date of Patent: Aug. 16, 2016

(54) ELECTRODE CONSTITUENT MEMBER FOR BATTERY MODULE

(75) Inventors: Ryuhei Nishida, Yokohama (JP); Tomoaki Nagayama, Yokohama (JP); Hirotatsu Kamimura, Yokohama (JP); Yuichi Yamauchi, Atsugi (JP)

(73) Assignees: NIFCO INC., Yokohama-shi, Kanagawa-ken (JP); NISSAN MOTOR CO., LTD., Yokohama-shi, Kanagawa-ken (JP)

( * ) Notice: Subject to any disclaimer, the term of this patent is extended or adjusted under 35 U.S.C. 154(b) by 330 days.

(21) Appl. No.: 14/233,598

(22) PCT Filed: Jul. 26, 2012

(86) PCT No.: PCT/JP2012/069022
§ 371 (c)(1),
(2), (4) Date: Jan. 17, 2014

(87) PCT Pub. No.: WO2013/015380
PCT Pub. Date: Jan. 31, 2013

(65) Prior Publication Data
US 2014/0154567 A1     Jun. 5, 2014

(30) Foreign Application Priority Data
Jul. 28, 2011   (JP) .................. 2011-165106

(51) Int. Cl.
*H01M 2/06*    (2006.01)
*H01M 2/26*    (2006.01)
(Continued)

(52) U.S. Cl.
CPC .............. *H01M 10/02* (2013.01); *H01M 2/06* (2013.01); *H01M 2/26* (2013.01); *H01M 2/30* (2013.01)

(58) Field of Classification Search
CPC ........... H01M 2/06; H01M 2/26; H01M 2/30; H01M 10/02
See application file for complete search history.

(56) References Cited

U.S. PATENT DOCUMENTS

| 2,845,470 A * | 7/1958 | Haskell ................. | H01M 4/762 |
| | | | 429/239 |
| 6,242,128 B1 * | 6/2001 | Tura ....................... | H01M 2/266 |
| | | | 29/623.1 |

(Continued)

FOREIGN PATENT DOCUMENTS

| JP | 2005-347043 A | 12/2005 |
| JP | 2008-071638 A | 3/2008 |

(Continued)

OTHER PUBLICATIONS

Machine Translation of: JP 2008/071638 A, Tatsuki et al., Mar. 27, 2008.*

(Continued)

*Primary Examiner* — Kenneth Douyette
(74) *Attorney, Agent, or Firm* — Manabu Kanesaka (57) ABSTRACT

An electrode constituent member for a battery module includes a current-carrying member including an internal connection portion relative to a tab-shaped terminal of an electricity-storage cell, and an external connection portion exposed to an outside of the battery module; a fastener member for fastening a member electrically connecting electrodes of a plurality of battery modules to the external connection portion of the current-carrying member; and an insulating member positioned between the external connection portion of the current-carrying member and the electricity-storage cell. In an inner side of the external connection portion, clamp portions receiving the insulating member in between are formed. In the clamp portions and the insulating member, respectively, engagement portions, engaging with each other when the insulating member is received, are formed.

8 Claims, 9 Drawing Sheets

(51) Int. Cl.
*H01M 2/30* (2006.01)
*H01M 10/02* (2006.01)

(56) References Cited

U.S. PATENT DOCUMENTS

| | | | | |
|---|---|---|---|---|
| 6,627,347 B2 * | 9/2003 | Fukuda | ................ | H01M 2/266 429/161 |
| 8,202,134 B2 | 6/2012 | Moon et al. | | |
| 8,771,863 B2 | 7/2014 | Amagai et al. | | |
| 2006/0270286 A1 * | 11/2006 | Zhao | .................... | H01M 2/206 439/840 |
| 2011/0014512 A1 | 1/2011 | Amagai et al. | | |

FOREIGN PATENT DOCUMENTS

| | | |
|---|---|---|
| JP | 2009-259424 A | 11/2009 |
| JP | 2011-023141 A | 2/2011 |
| KR | 10-2010-0111307 A | 10/2010 |
| WO | 2011/102344 A1 | 8/2011 |

OTHER PUBLICATIONS

PCT, International Search Report for PCT/JP2012/069022.
Korea Patent Office, "Office Action for KR 10-2014-7002327," Dec. 30, 2015.

* cited by examiner

ELECTRODE CONSTITUENT MEMBER FOR BATTERY MODULE

RELATED APPLICATIONS

The present application is National Phase of International Application No. PCT/JP2012/069022 filed Jul. 26, 2012, and claims priority from Japanese Application No. 2011-165106, filed Jul. 28, 2011.

FIELD OF TECHNOLOGY

The present invention relates to an improvement of an electrode constituent member forming an electrode of a battery module, which is a part of the battery module forming an electricity storage system for a hybrid car, an electric car, and the like.

BACKGROUND ART

The electricity storage system for the hybrid car and the like is formed by a plurality of battery modules. Also, in each battery module, an electricity-storage cell forming a flat plate shape is housed in a case in a stack manner. In the case of the battery module, there is provided an electrode electrically connected to the inside electricity-storage cell, and using the electrode, a connection to a terminal outside the battery module is carried out. The electrode of such battery module is provided with two portions or above in the aforementioned case.

In such battery module, there is a battery module provided with a bolt in the aforementioned electrode. (See Patent Document 1) The bolt protrudes at an axis portion to an outside through a through-bore formed in a terminal plate. An insulating member is attached to an inner face of the terminal plate, and a head portion of the bolt is pressed by the insulating member. The terminal plate and the insulating member are temporarily attached. (FIG. 3 in the Patent Document 1) In the battery module in the Patent Document 1, the aforementioned insulating member is combined with a movement restriction member, and in a case wherein an external force has acted on the terminal plate, a force is transmitted from the terminal plate to the bolt, from the bolt to the insulating member, and furthermore, to the insulating member and the movement restriction member to thereby wobble easily at a time when such external force acts.

PRIOR ART DOCUMENT

Patent Document

Patent Document 1: Japanese Unexamined Patent Application Publication No. 2009-259424

SUMMARY OF THE INVENTION

Problems to be Solved by the Invention

A main object to be obtained by the present invention is that a current-carrying member and the insulating member forming this kind of electrode constituent member can be combined more easily and appropriately.

Means for Solving the Problems

In order to obtain the aforementioned object, in the present invention, an electrode constituent member for a battery module, forming an electrode of the battery module formed by housing an electricity-storage cell in a case, comprises a current-carrying member including an internal connection portion electrically connected to the electricity-storage cell, and an external connection portion exposed to an outside of the case; a fastener member passing through a through hole formed in the external connection portion of the current-carrying member from an inner side of the case so as to protrude one portion to the outside of the case, and by the protruded one portion, fastening a member electrically connecting electrodes of a plurality of battery modules; and an insulating member positioned between the fastener member and the electricity-storage cell. In the external connection portion, there is formed a pair of clamp portions extending to the inner side of the case, and receiving the insulating member in between. Also, in the clamp portions and the insulating member, there are respectively formed engagement portions engaging with each other accompanied by the aforementioned receiving.

Effect of the Invention

According to the invention, first, the insulating member is received between the clamp portions, so that the current-carrying member and the insulating member can be integrated by an engagement. Secondly, by the insulating member integrated with the current-carrying member in the aforementioned manner, the fastener member can be prevented from moving into the case forming the battery module. Thereby, reliability of the fastening by such fastener member can be improved. Also, in the invention, the current-carrying member is integrated with the single insulating member, so that in a case wherein an external force acts on the current-carrying member, it is difficult to wobble compared to the battery module of the Patent Document 1 when the foregoing external force acts.

An external connection portion side of the electrode constituent member is inserted to pass through a communication portion having an angular hole shape allowing to communicate inside and outside of the battery module. Therewith, at a time of the aforementioned insertion into the communication portion, the external connection portion side of the electrode constituent member is housed respectively in an inner side of corresponding inner corner portions of the communication portion, and sometimes there are formed outer corner portions in the insulating member, which respectively abut against the inner corner portions. In such case, a torque generated by touching the aforementioned fastening can be received by the inner corner portions of the communication portion and the outer corner portions of the insulating member.

Namely, according to the invention, the insulating member placed between the current-carrying member and the electricity-storage cell can be easily and appropriately combined relative to the current-carrying member to which a member electrically connecting the electrodes of the plurality of battery modules is fastened.

BEST MODE OF CARRYING OUT THE INVENTION

Hereinafter, with reference to FIG. 1 to FIG. 16, embodiments for implementing the present invention will be explained. An electrode constituent member for a battery module according to the embodiment forms an electrode Ma of a battery module M by becoming one portion of the battery module M (also called an electricity storage module, a module, and the like) forming an electricity storage system (also called an electricity storage unit and the like) for a hybrid car, an electric car, and the like. Namely, such electrode constituent member forms the electrode Ma of the battery module M electrically connected to a member P which electrically connects between electrodes Ma of a plurality of battery modules M outside the battery module M. The battery module M comprises electricity-storage cells Mb, and a case Mc housing the electricity-storage cells Mb. The electricity-storage cells Mb are formed to have a flat plate shape. In an illustrated example, the battery module M is formed such that a plurality of sheets of electricity-storage cells Mb is housed in the case Mc having a flat box shape in a state of being disposed in a lamination fashion. Each electricity-storage cell Mb is connected in series or in parallel inside the case Mc.

Figure 1:
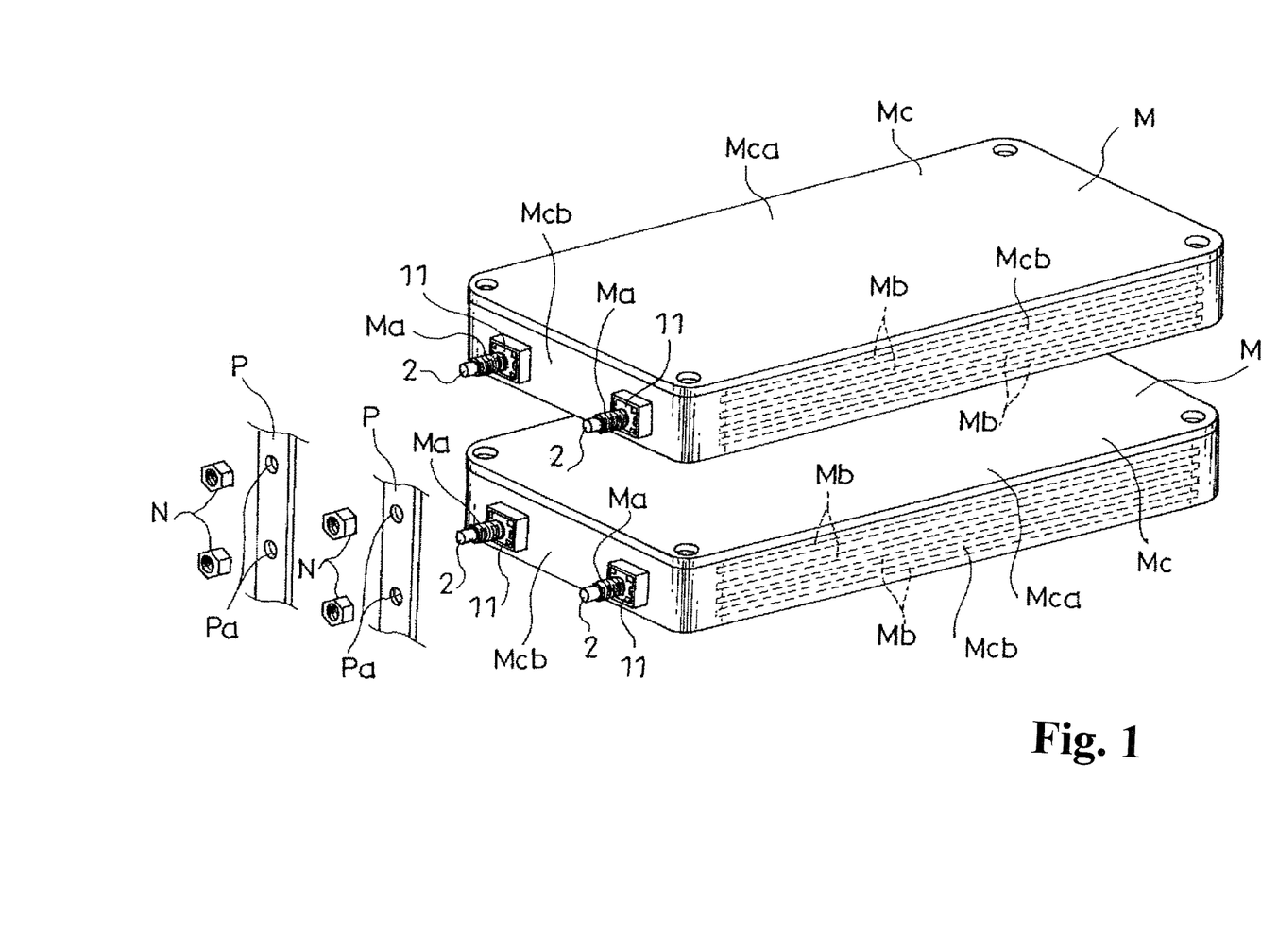
FIG. 1 is a perspective structural view of a battery module according to an embodiment of the present invention and a member electrically connecting a plurality of battery modules.
Figure 2:
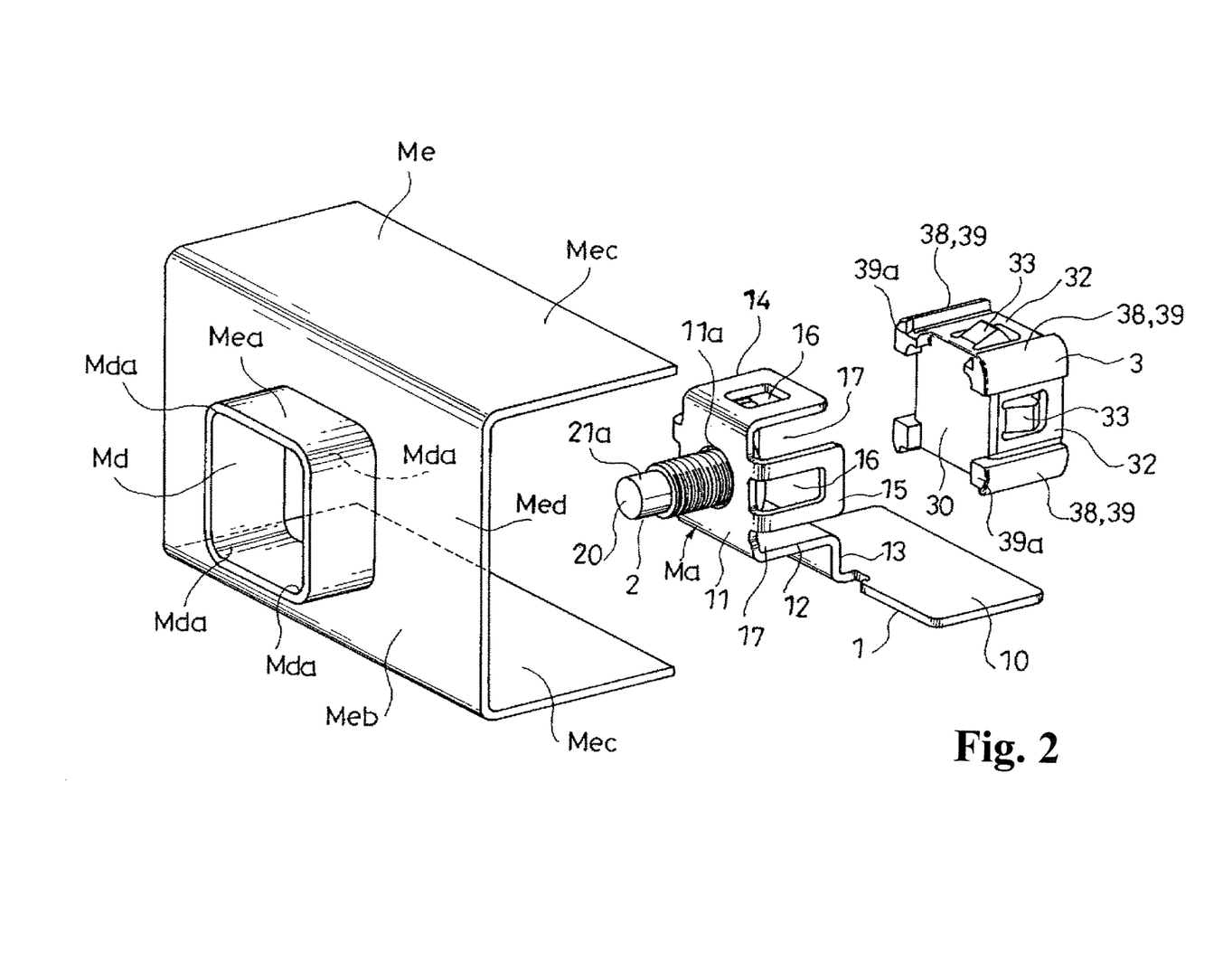
FIG. 2 is a perspective view showing a state wherein a cover and an electrode constituent member, forming the battery module, are separated.
Figure 3:
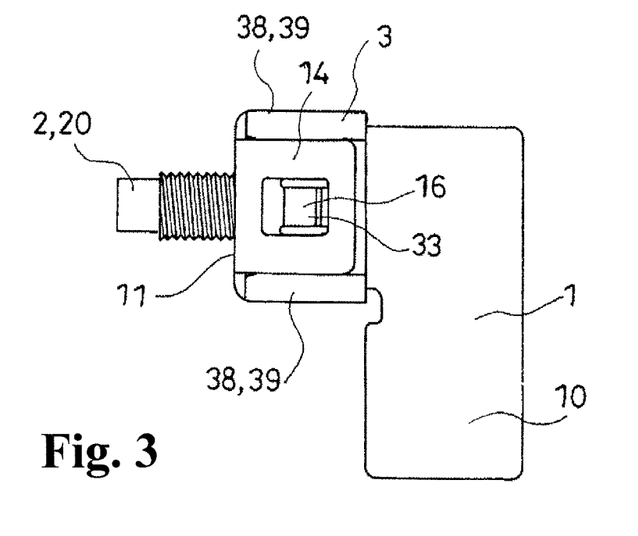
FIG. 3 is a plan view of the electrode constituent member.
Figure 4:
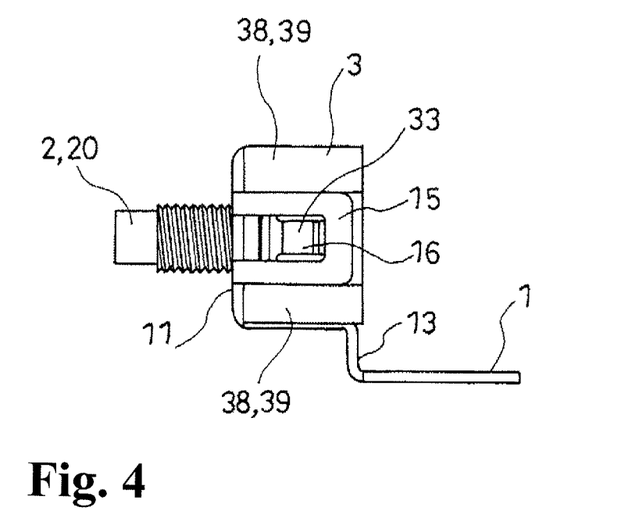
FIG. 4 is a side view of the electrode constituent member.
Figure 5:
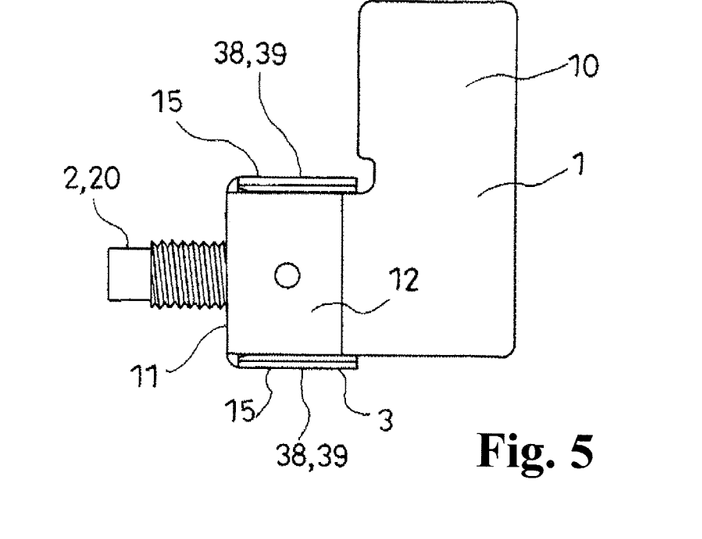
FIG. 5 is a bottom view of the electrode constituent member.
Figure 6:
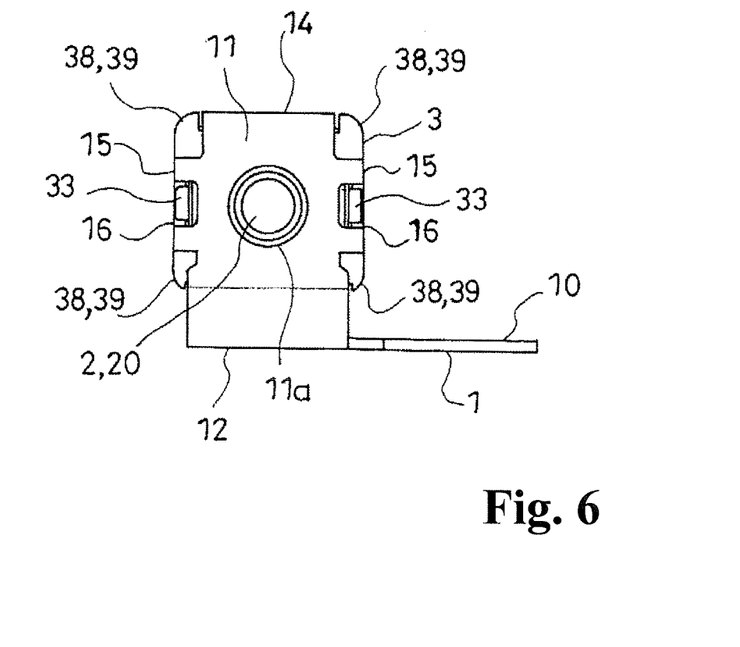
FIG. 6 is a front view of the electrode constituent member.
Figure 7:
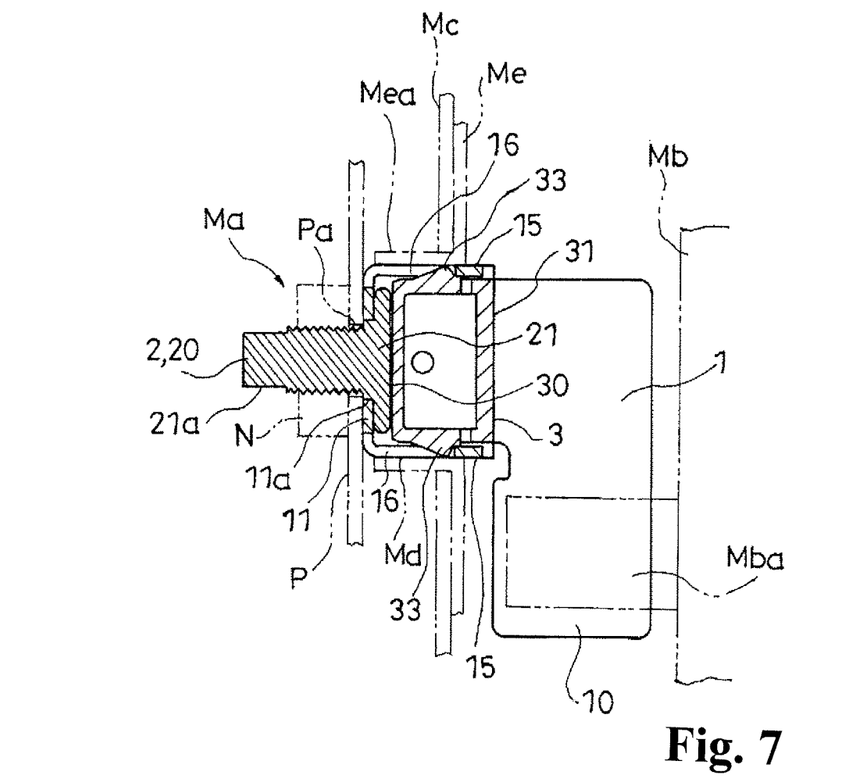
FIG. 7 is a cross-sectional view of the electrode constituent member in a state of becoming one portion of the battery module.
Figure 8:
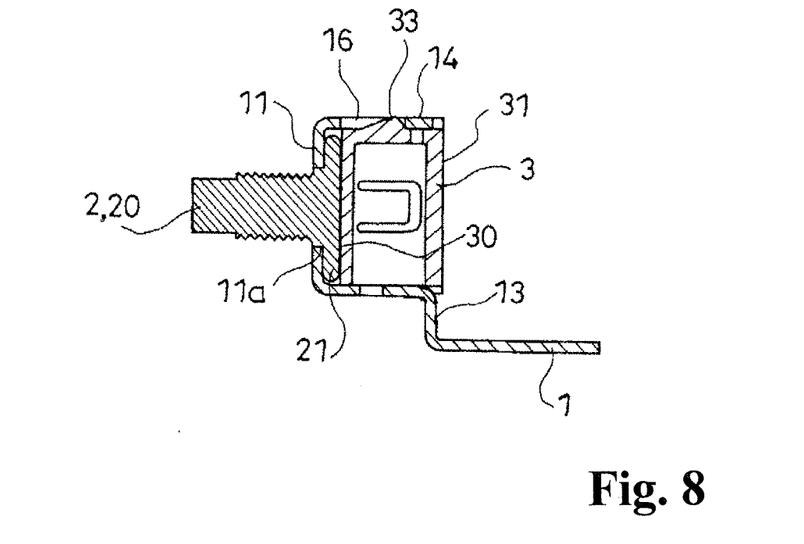
FIG. 8 is a cross-sectional view of the electrode constituent member.
Figure 9:
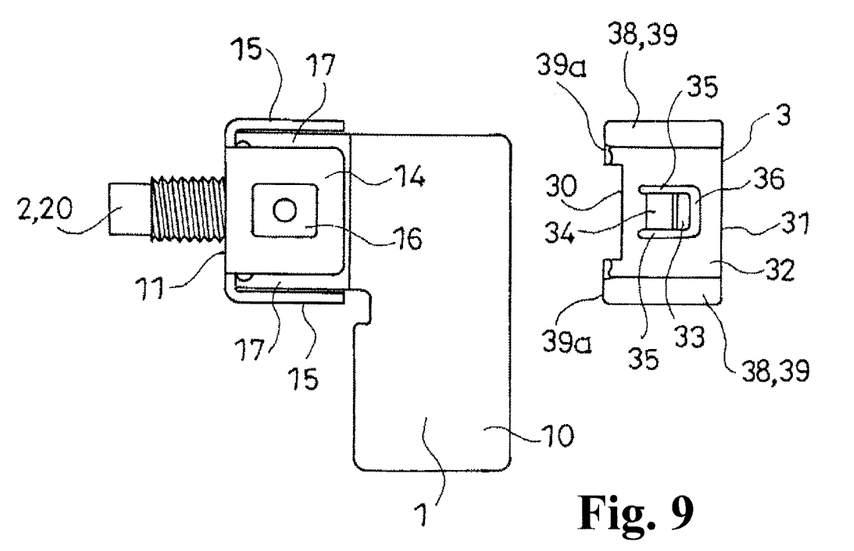
FIG. 9 is a plan view in a state wherein a current-carrying member side and an insulating member are separated in the embodiment of the present invention.
Figure 10:
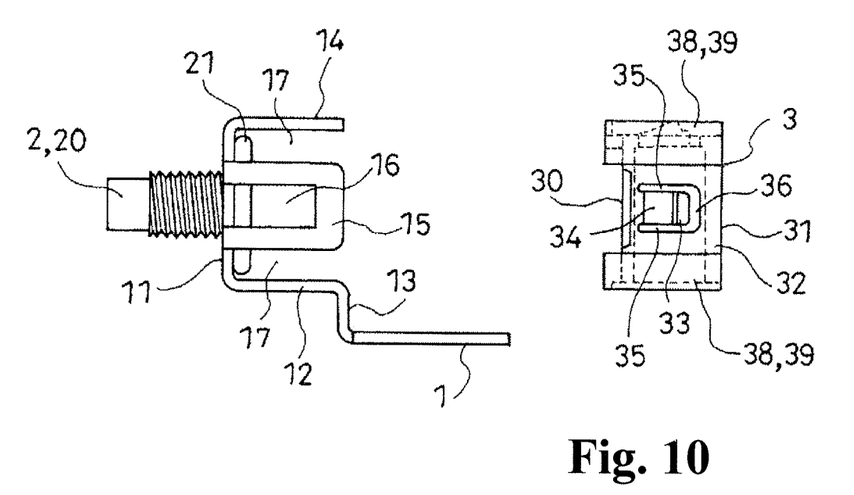
FIG. 10 is a side view in the state wherein the current-carrying member side and the insulating member are separated.
Figure 11:
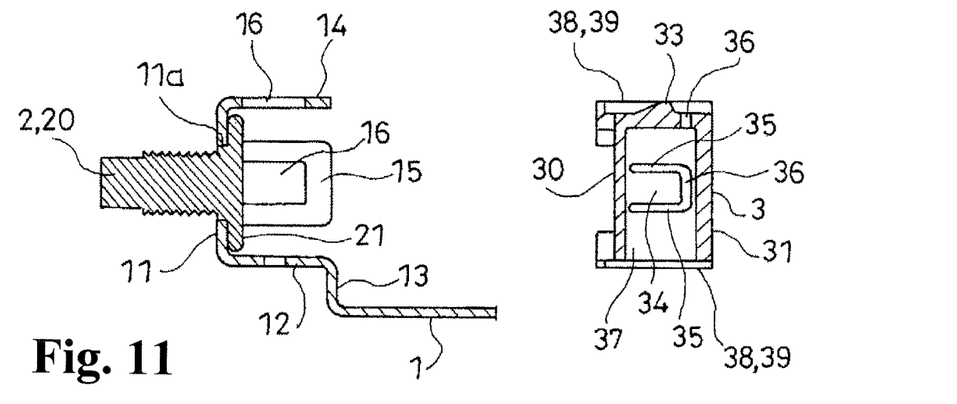
FIG. 11 is a vertical cross-sectional view in the state wherein the current-carrying member side and the insulating member are separated.
Figure 12:
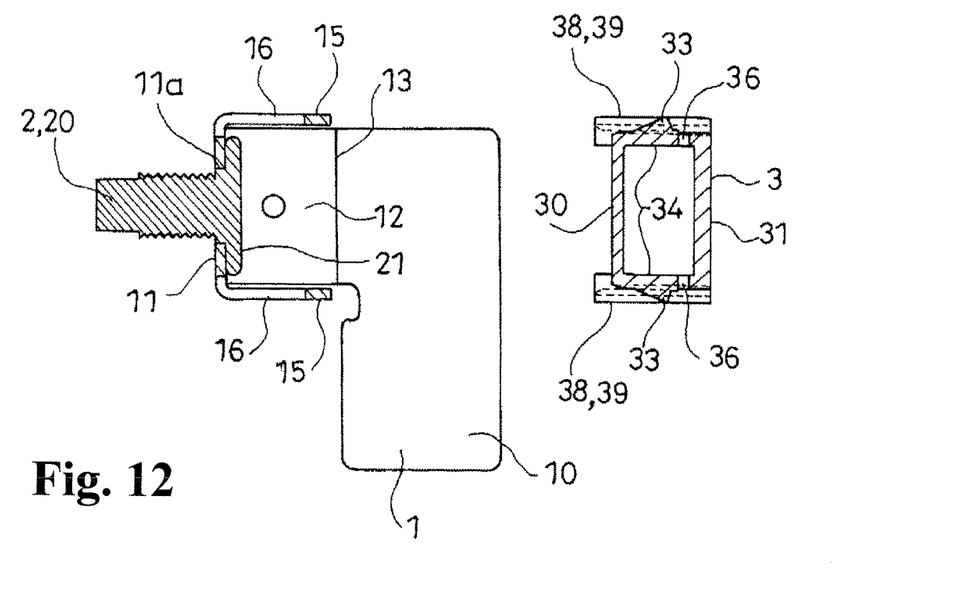
FIG. 12 is a horizontal cross-sectional view in the state wherein the current-carrying member side and the insulating member are separated.
Figure 13:
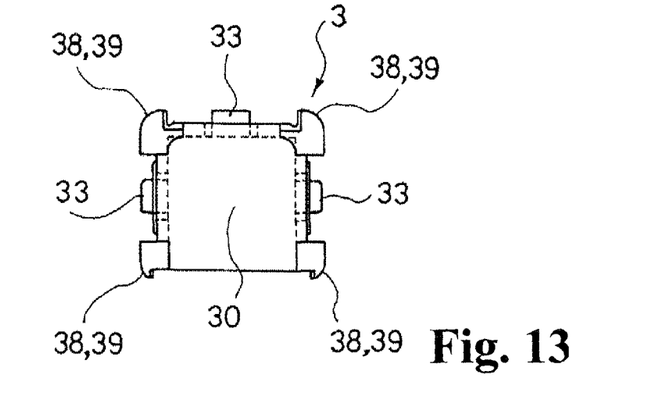
FIG. 13 is a front view of the insulating member.
Figure 14:
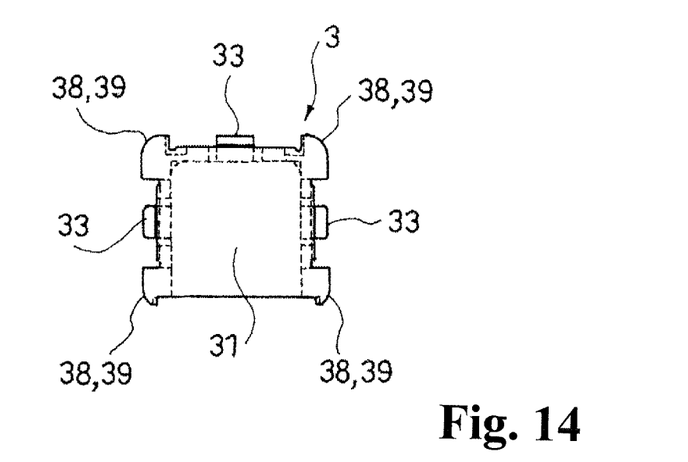
FIG. 14 is a rear view of the insulating member.

The electrode constituent member for a battery module according to the embodiment includes a current-carrying member 1 electrically connected to a terminal provided in one of each electricity-storage cell Mb which is integrally connected in the aforementioned fashion, in the illustrated example, to a tab-shaped terminal Mba (FIG. 7). Also, the electrode constituent member for a battery module connects the aforementioned member P electrically connecting between the electrodes Ma of the plurality of battery modules M outside the battery module M through the current-carrying member 1, and each electricity-storage cell Mb.

The electrode constituent member comprises the current-carrying member 1, a bolt member 2 as a fastener member, and an insulating member 3. Such current-carrying member 1 and bolt member 2 are formed by an electrically-conductive material. Also, typically, the insulating member 3 is formed by synthetic resin.

In a completion state of the battery module M, the insulating member 3 is positioned inside the aforementioned case Mc. The current-carrying member 1 includes an internal connection portion 10 electrically connected to the tab-shaped terminal Mba of the electricity-storage cell Mb; and an external connection portion 11 electrically connected to the aforementioned member P, and in the completion state of the battery module M, only the external connection portion 11 is exposed to an outside of the battery module M. (FIG. 1 and FIG. 7) In the illustrated example, the case Mc includes both wide faces Mca and Mca having approximately a rectangular shape; and four thickness-side lateral faces Mcb ranged between both faces Mca and Mca. Through an opening formed in one lateral face Mcb along a width direction of the case Mc among the four thickness-side lateral faces Mcb, the external connection portion 11 of the current-carrying member 1 faces an outer side of the case Mc.

In the illustrated example, the current-carrying member 1 is formed by providing a bending work to a metal plate. The external connection portion 11 is integrally connected relative to the internal connection portion 10 through an intermediate portion 12. The internal connection portion 10 and the intermediate portion 12 are connected so as to provide an L shape. One surface of the internal connection portion 10 and one surface of the intermediate portion 12 are not positioned on the same surface, and there is formed a step 13 between the aforementioned portions. The external connection portion 11 is formed by a rising portion rising in such a way as to form a right angle between the external connection portion 11 and the intermediate portion 12 from a terminal opposite to a connection side to the internal connection portion 10 in the intermediate portion 12. More specifically, the external connection portion 11 is formed to have a plate shape having approximately a square shape whose one side is approximately equal to a width of the intermediate portion 12. Also, one side of the external connection portion 11 and the aforementioned terminal of the intermediate portion 12 are integrally connected.

In the other three sides of the external connection portion 11, respectively, there is connected one end side of clamp plate portions 14 and 15 extending to the aforementioned step 13 side in such a way as to form a right angle between the clamp plate portions 14 and 15, and the external connection portion 11. In the clamp plate portion 14 on an upper side facing the intermediate portion 12, there is formed a square-shaped engagement hole 16 in a penetration state. Also, in the clamp plate portion 15 on a left side and the clamp plate portion 15 on a right side, respectively, there are formed engagement holes 16 respectively positioned in right and left of the intermediate portion 12, and having a long hole shape continuing long in an extension direction of the clamp plate portions 14 and 15.

Between the clamp plate portion 15 on the left side and the clamp plate portion 14 on the upper side, and between the clamp plate portion 15 on the left side and the intermediate portion 12; and between the clamp plate portion 15 on the right side and the clamp plate portion 14 on the upper side, and between the clamp plate portion 15 on the right side and the intermediate portion 12, there are formed gaps 17 into which the later-mentioned rib-shaped portions 39 of the insulating member 3 enter.

The bolt member 2 includes an axis portion 20 provided with a male screw on an outer circumference, and a head portion 21 having a flat head shape. In the external connection portion 11 of the current-carrying member 1, there is formed a through hole 11a, having a size through which the axis portion 20 can pass although the head portion 21 of the bolt member 2 cannot pass, in such a way as to pass through inside and outside of the external connection portion 11. In the illustrated example, a hole diameter of the through hole 11a is slightly smaller than a diameter of the axis portion 20 of the bolt member 2, and while slightly deforming the through hole 11a from an inner face side of the external connection portion 11, the axis portion 20 of the bolt member 2 is inserted to pass through and fitted into the through hole 11a so as to protrude from an outer face of the external connection portion 11. In the illustrated example, an end side of the axis portion 20 of the bolt member 2 has become a non-screw portion 21a so as to easily insert and pass the axis portion 20 of the bolt member 2 through a female screw hole of a nut N.

In the embodiment, the member P electrically connecting between the electrodes Ma of the plurality of battery modules M is electrically connected to the external connection portion 11 of the current-carrying member 1 using such bolt member 2. Specifically, in a state wherein the axis portion 20 of the bolt member 2 has passed through a through-hole Pa formed in such member P, the nut N is screwed in the axis portion 20, so that such member P is attached firmly to the outer face of the external connection portion 11 so as to electrically connect both members. (FIG. 7)

On the other hand, the insulating member 3 is combined with the current-carrying member 1, and is positioned between the external connection portion 11 and the electricity-storage cell Mb.

In the illustrated example, the insulating member 3 has a hollow cuboid shape. A distance between a front face 30 and a back face 31 of such insulating member 3 is approximately equal to a distance between an inner face of the external connection portion 11 and the step 13. Also, among four lateral faces 32 positioned between the front face 30 and the back face 31 of such insulating member 3, a distance between two lateral faces 32 and 32 which are located opposite to each other is approximately equal to a distance between the clamp plate portion 14 on the upper side and the intermediate portion 12. Also, a distance between the other two lateral faces 32 and 32 is approximately equal to a distance between the clamp plate portion 15 on the left side and the clamp plate portion 15 on the right side.

Thereby, in the illustrated example, the insulating member 3 can be housed inside a space formed among the aforementioned three portions of the clamp plate portions 14 and 15, and the intermediate portion 12 from the front face 30 of the insulating member 3 first. Then, in that housed state, the front face 30 of the insulating member 3 clamps the head portion 21 of the bolt member 2 between the front face 30 of the insulating member 3 and the inner face of the external connection portion 11. (FIG. 7 and FIG. 8) Namely, in the embodiment, by the clamp plate portion 15 on the left side and the clamp plate portion 15 on the right side, inside the external connection portion 11, there are formed clamp portions forming a pair and receiving the insulating member 3 in between.

Therewith, in the embodiment, in the clamp portions forming such pair, i.e., both the clamp plate portion 15 on the left side and the clamp plate portion 15 on the right side, the insulating member 3, there are respectively formed engagement portions engaging with each other accompanied by the aforementioned receiving. In the illustrated example, furthermore, there is formed an engagement portion in the clamp plate portion 14 on the upper side as well.

Namely, at a time of the aforementioned receiving, in the lateral face 32 on the left side internally contacted with the clamp plate portion 15 on the left side, and the lateral face 32 on the right side internally contacted with the clamp plate portion 15 on the right side in the insulating member 3, there are respectively formed engagement protrusions 33. Also, in the lateral face 32 on the upper side internally contacted with the clamp plate portion 14 on the upper side, there is formed an engagement protrusion 33. Each engagement protrusion 33 is formed in an outer face of an elastic claw 34 formed by sectioning one portion of the insulating member 3 by a pair of dividing grooves 35 and 35 continuing long in a front-back direction, and a dividing groove 36 ranged between back ends of the pair of dividing grooves 35 and 35. Each engagement protrusion 33 protrudes outwardly more than the lateral face 32 of the insulating member 3, the aforementioned receiving is allowed by bending each elastic piece 34, and in that receiving completion position, each elastic piece 34 returns to be bent, so that the corresponding engagement protrusion 33 enters into and engages the corresponding engagement hole 16 so as to maintain the aforementioned receiving state. Namely, in the embodiment, the engagement hole 16 functions as an engagement portion on a clamp portion side, and the engagement protrusion 33 functions as an engagement portion on an insulating member 3 side. Incidentally, in the illustrated example, on a lateral face on a lower side of the insulating member 3, there is formed an open portion 37 communicated with an inside of the insulating member 3.

Thereby, in the electrode constituent member according to the embodiment, first, the insulating member 3 is received between the aforementioned clamp portions forming the pair, so that the current-carrying member 1 and the insulating member 3 can be integrated by an engagement. Namely, for example, without requiring conventional caulking, the current-carrying member 1 and the insulating member 3 can be easily integrated. Secondly, the insulating member 3 integrated with the current-carrying member 1 in the aforementioned manner can hold the bolt member 2 so that the bolt member 2 does not move to the inside of the case forming the battery module M. Namely, by the aforementioned receiving, one portion of the insulating member 3, in the illustrated example, the front face 30 becomes an abutment portion relative to the head portion 20 of the bolt member 2. Specifically, by engaging the engagement protrusions 33 with the engagement holes 16 of the clamp plate portions 14 and 15, the insulating member 3 is solidly positioned in a position such that the front face 30 thereof always abuts against the head portion 20 of the bolt member 2.

Also, in the embodiment, an external connection portion 11 side of the electrode constituent member is inserted to pass through a communication portion Md having a square hole shape allowing to communicate inside and outside of the battery module M. Also, at a time of the aforementioned insertion into the communication portion Md, there are formed outer corner portions 38 in the insulating member 3, which are respectively housed in an inner side of corresponding inner corner portions Mda of the communication portion Md, and respectively abut against the inner corner portions Mda thereof.

In the illustrated example, the rib-shaped portions 39 are respectively formed between adjacent lateral faces of the insulating member 3, and accompanied by the aforementioned receiving, the rib-shaped portions 39 enter into the aforementioned gaps 17. Then, by the entered rib-shaped portions 39, and the three portions of the clamp plate portions 14 and 15 and the intermediate portion 12, an outer outline shape of a cross-sectional face of the aforementioned portions has a shape following the communication portion Md whose inner outline shape is a square shape. Then, in a state wherein the external connection portion 11 side of the electrode constituent member is inserted to pass through such communication portion Md, the rib-shaped portions 39 are positioned respectively in the inner corner portions Mda of the communication portion Md. Namely, in the embodiment, such rib-shaped portions 39 function as the outer corner portions 38.

In the illustrated example, such rib-shaped portions 39 protrude forward more than the front face 30 of the insulating member 3, and in a state wherein the insulating member 3 has been housed inside the aforementioned space, front ends 39a of the rib-shaped portions 39 are positioned approximately in the same position as the front face of the external connection portion 11.

In the illustrated example, the communication portion Md is formed by an angular cylindrical portion Mea of a cover Me including the angular cylindrical portion Mea. Such cover Me comprises a main member portion Meb with a C shape of a cross-sectional surface including a pair of horizontal plate portions Mec and Mec, and a vertical plate portion Med ranged between the pair of horizontal plate portions Mec and Mec, which houses end portions of the electricity-storage cells Mb on an inner side. The angular cylindrical portion Mea is formed in such a way as to protrude from an outer face of the vertical plate portion Med of the main member portion Meb so as to communicate inside and outside of the cover Me. Such cover Me is housed outside the case Mc in such a way that only a protruding end side of the angular cylindrical portion Mea faces. (FIG. 1 and FIG. 7) The external connection portion 11 side of the electrode constituent member is inserted into the angular cylindrical portion Mea to pass through from the inner side of such cover Me, and the outer face of the external connection portion 11 is positioned in a protruding end of the angular cylindrical portion Mea.

Thereby, in the electrode constituent member according to the embodiment, a torque generated by touching the aforementioned bolt stop is received by the inner corner portions Mda of the communication portion Md, and the outer corner portions 38 of the insulating member 3. Also, in the embodiment, between the inner corner portions Mda of the communication portion Md, faces of the clamp plate portions 14 and 15 contact with an inner face of the communication portion Md so as to receive the aforementioned torque here as well. Therefore, there is no possibility that by touching the bolt stop, the bolt member 2 and the current-carrying member 1 simultaneously rotate. Incidentally, in a space between the back face 31 of the insulating member 3 and the end portions of the electricity-storage cells Mb, there may be placed a spacer which is not shown in the figures. In this way, even if an engagement between the current-carrying member 1 and the insulating member 3 is released by touching the aforementioned bolt stop, such spacer can prevent the insulating member 3 from moving into the case Mc.

Figure 15:
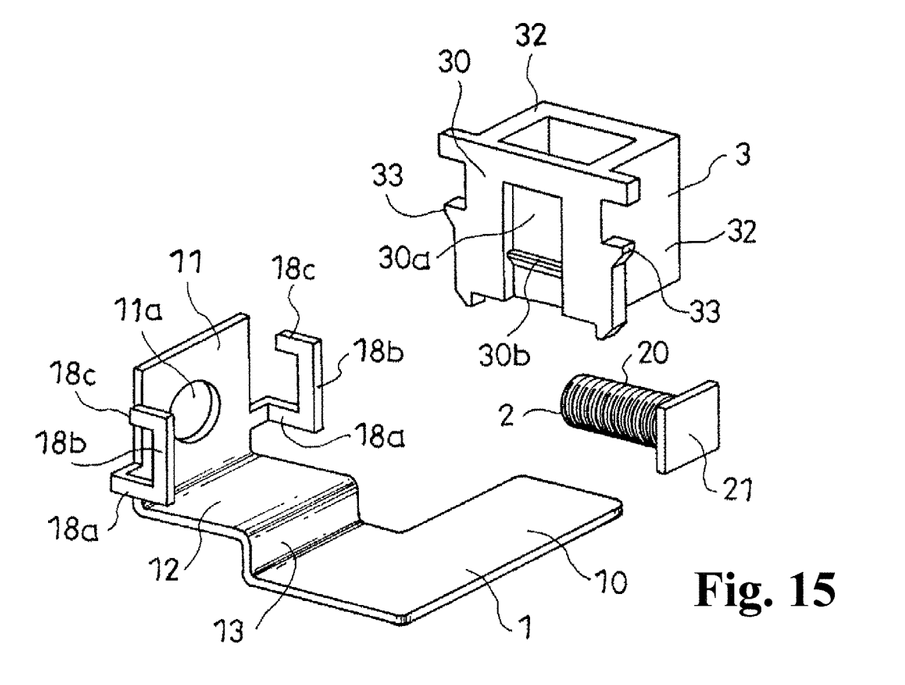
FIG. 15 is an exploded perspective structural view showing another structural example of the electrode constituent member.
Figure 16:
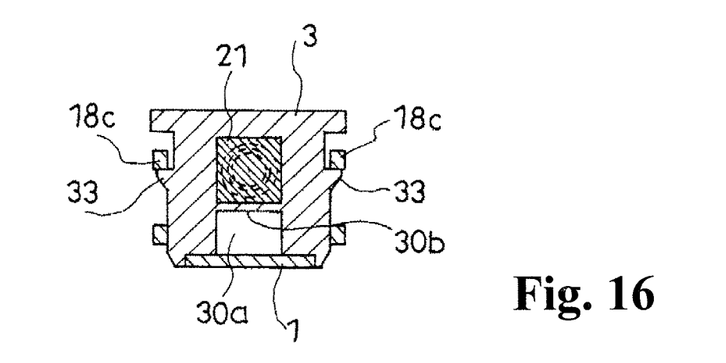
FIG. 16 is a cross-sectional structural view of essential parts showing a combination state of the structural example in FIG. 15.

In FIG. 15 and FIG. 16, the current-carrying member 1 does not comprise the clamp plate portion 14 on the upper side of the above-explained example shown in FIG. 1 to FIG. 14. In an example in FIG. 15 and FIG. 16, the aforementioned clamp portions are included respectively in right and left on an inner side of the external connection portion 11, and the insulating member 3 is entered between the right-and-left clamp portions from above by a slide movement operation from a direction orthogonal to a plate face of the intermediate portion 12 such that the front face thereof slidably contacts with the inner face of the external connection portion 11. The aforementioned right-and-left clamp portions are formed respectively by first arm portions 18a protruding inward from edge portions of the external connection portion 11; second arm portions 18b extending upward from protruding ends of the first arm portions 18a; and hook portions 18c protruding to an inner face side of the external connection portion 11 from upper ends of the second arm portions 18b. In right and left of the insulating member 3, the engagement protrusions 33 are respectively formed, and in a process of the aforementioned slide movement operation, after the clamp portions, which abut against the engagement protrusions 33, bend outward once, in a position wherein the insulating member 3 has been completely entered between the right-and-left clamp portions, the clamp portions return to bend inward, so that the hook portions 18c are caught on upper sides of the engagement protrusions 33. Namely, in that example, the hook portions 18c function as the engagement portion on the clamp portion side, and the engagement protrusions 33 function as the engagement portion on the insulating member 3 side. Incidentally, in that example, in the front face 30 of the insulating member 3, there is formed a groove-like concave 30a into which the head portion 21 of the bolt member 2 can be housed. The concave 30a is open outward at a lower side of the front face 30 of the insulating member 3, and at a time of the aforementioned slide movement operation, the head portion 21 of the bolt member 2 enters into the concave 30a from a portion where the concave 30a is open. In a position of approximately a middle in an up-and-down direction of the concave 30a, there is formed a dividing rib 30b ranged in a width direction of the concave 30a, and in the process of the slide movement operation, by an elastic deformation on a dividing rib 30b side, the head portion 21 of the bolt member 2 climbs over the dividing rib 30b. Also, in the position wherein the insulating member 3 has been completely entered between the right-and-left clamp portions, the head portion 21 of the bolt member 2 is housed between the dividing rib 30b and an upper end of the concave 30a without wobbling. (FIG. 16)

All contents of the specification, claims, drawings, and abstract of Japanese Patent Application No. 2011-165106 filed on Jul. 28, 2011 are cited in their entireties herein and are incorporated as a disclosure of the specification of the present invention.

What is claimed is:

1. An electrode constituent member for a battery module having an electricity-storage cell and a case housing the electricity-storage cell, comprising:
   a current-carrying member including an internal connection portion for electrically connecting to the electricity-storage cell, and an external connection portion exposed to an outside of the case;
   a bolt member including a head portion, and an axis portion extending from the head portion and passing through a through hole of the external connection portion of the current-carrying member from an inner side of the case to protrude to the outside of the case, for fastening to a member electrically connecting a plurality of battery modules; and
   an insulating member positioned between the bolt member and the electricity-storage cell,
   wherein the external connection portion is formed with a pair of clamp portions, extending to the inner side of the case and receiving the insulating member in between,
   the clamp portions and the insulating member respectively are formed with engagement portions engaging with each other when the insulating member is received, and the head portion of the bolt member is disposed between the external connection portion and the insulating member to electrically connect to the current carrying member through the external connection portion.

2. An electrode constituent member for a battery module according to claim 1, wherein one portion of the insulating member becomes an abutment portion abutting from the inner side of the case relative to the bolt member.

3. An electrode constituent member for a battery module according to claim 1, further comprising the case including a communication portion having a square hole shape communicating inside and outside thereof,
   wherein the external connection portion is inserted to pass through the communication portion, and
   the insulating member includes outer corner portions, which are housed respectively in an inner side of corresponding inner corner portions of the communication portion, and respectively abut against the inner corner portions thereof.

4. An electrode constituent member for a battery module according to claim 3, wherein the clamp portions abut against an inner face other than the inner corner portions of the communication portion.

5. An electrode constituent member according to claim 1, wherein the engagement portions of the insulating member are engagement protrusions, and
   the engagement portions of the clamp portions are engagement holes to engage the engagement protrusions of the insulating member.

6. An electrode constituent member according to claim 5, wherein the external connection portion of the current-carrying member further comprises
   a main body portion having a rectangular plate shape and the through hole formed therein,
   the pair of clamp portions extending from first and second edges of the main body portion opposite to each other in respect to the through hole and toward the inner side of the case,
   an intermediate portion extending from a third edge of the main body portion and connecting to the internal connection portion,
   another clamp portion extending from another edge of the main body portion toward the inner side of the case, the another clamp portion being located at a side facing the intermediate portion, and
   four gaps formed at four corners of the main body portion between the pair of clamp portions and the intermediate portion, and between the pair of clamp portions and said another clamp portion.

7. An electrode constituent member according to claim 6, wherein the insulating member has a cuboid shape including
   a front face abutting against the head portion of the bolt member,
   lateral faces having the engagement protrusions corresponding to the engagement holes, and
   four outer corner portions disposed at four corners of the insulating member and each fitting into the corresponding gaps of the external connection portion.

8. An electrode constituent member according to claim 7, wherein the insulating member further comprises a back face opposite to the front face, and
   the outer corner portions extend from the back face toward and beyond the front face so that ends of the outer corner portions are flush with a face of the main body portion of the external connection portion.

* * * * *